US008442817B2

(12) United States Patent
Naka et al.

(10) Patent No.: US 8,442,817 B2
(45) Date of Patent: May 14, 2013

(54) APPARATUS AND METHOD FOR VOICE ACTIVITY DETECTION

(75) Inventors: Nobuhiko Naka, Yokohama (JP); Tomoyuki Ohya, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 661 days.

(21) Appl. No.: 11/024,267

(22) Filed: Dec. 23, 2004

(65) Prior Publication Data

US 2005/0154583 A1 Jul. 14, 2005

(30) Foreign Application Priority Data

Dec. 25, 2003 (JP) ................................ P2003-430973

(51) Int. Cl.

*G10L 19/00* (2006.01)
*G10L 11/04* (2006.01)
*G10L 11/06* (2006.01)
*G10L 15/20* (2006.01)

(52) U.S. Cl.

USPC ............ 704/217; 704/207; 704/208; 704/233

(58) Field of Classification Search ........... 704/211–217
See application file for complete search history.

(56) References Cited

U.S. PATENT DOCUMENTS 4,715,065 A 12/1987 Parker ............................. 381/46
4,811,404 A 3/1989 Vilmur et al. ................... 381/94
4,959,865 A * 9/1990 Stettiner et al. ............... 704/233
5,276,765 A * 1/1994 Freeman et al. .............. 704/233
5,485,522 A 1/1996 Solve et al. ..................... 381/56
5,657,422 A 8/1997 Janiszewski et al. ........ 395/2.37
5,819,218 A 10/1998 Hayata et al.
5,963,901 A * 10/1999 Vahatalo et al. .............. 704/233
5,970,441 A * 10/1999 Mekuria ....................... 704/207
5,991,718 A 11/1999 Malah
6,055,499 A * 4/2000 Chengalvarayan et al. .. 704/250

(Continued)

FOREIGN PATENT DOCUMENTS

JP 54094212 A 7/1979
JP S56-135898 10/1981

(Continued)

OTHER PUBLICATIONS

Rabiner and Schafer, Digital Processing of Speech Signals, 1978. Prentice-Hall, Englewood Cliffs. New Jersey. pp. 140-149.*

(Continued)

*Primary Examiner* — Pierre-Louis Desir
*Assistant Examiner* — Matthew Baker
(74) *Attorney, Agent, or Firm* — Brinks Hofer Gilson & Lione

(57) ABSTRACT

It is provided a voice activity decision apparatus capable of accurately performing the decision on the state being associated with a sound interval or a silence interval also in terms of the input signal having many aperiodic components and/or plural mixed different periodic components. The apparatus 1 comprises: an autocorrelation calculating unit 11 for calculating autocorrelation values of an input signal; a delay calculating unit 12 for calculating plural delays at which autocorrelation values calculated by the autocorrelation calculating unit 11 become maximums; a noise deciding unit 13 for deciding whether the input signal is a noise or not based on the plurality of delays calculated by the delay calculating unit 12; and an activity decision unit 14 for performing the activity decision in terms of the input signal based on results of decision by the noise deciding unit 13 and the input signal.

34 Claims, 7 Drawing Sheets

U.S. PATENT DOCUMENTS

| | | | | |
|---|---|---|---|---|
| 6,108,610 | A | 8/2000 | Winn | |
| 6,154,721 | A | 11/2000 | Sonnic | |
| 6,199,035 | B1 | 3/2001 | Lakaniemi et al. | 704/207 |
| 6,240,386 | B1 * | 5/2001 | Thyssen et al. | 704/220 |
| 6,453,285 | B1 | 9/2002 | Anderson et al. | |
| 6,493,665 | B1 * | 12/2002 | Su et al. | 704/230 |
| 6,618,701 | B2 | 9/2003 | Piket et al. | |
| 6,658,380 | B1 | 12/2003 | Lockwood et al. | 704/215 |
| 6,671,667 | B1 | 12/2003 | Chandran et al. | |
| 6,675,114 | B2 * | 1/2004 | Ando et al. | 702/75 |
| 6,842,526 | B2 | 1/2005 | Walker | 381/94.1 |
| 6,865,529 | B2 * | 3/2005 | Brandel et al. | 704/207 |
| 7,013,269 | B1 * | 3/2006 | Bhaskar et al. | 704/219 |
| 7,146,314 | B2 | 12/2006 | Wang | |
| 7,487,083 | B1 | 2/2009 | Zhang | 704/214 |
| 7,529,670 | B1 * | 5/2009 | Michaelis | 704/253 |
| 7,653,537 | B2 * | 1/2010 | Padhi et al. | 704/218 |
| 2002/0116186 | A1 * | 8/2002 | Strauss et al. | 704/233 |
| 2002/0152066 | A1 | 10/2002 | Piket | 704/226 |
| 2003/0218614 | A1 * | 11/2003 | Lavelle et al. | 345/539 |
| 2004/0064314 | A1 | 4/2004 | Aubert et al. | 704/233 |
| 2004/0073420 | A1 * | 4/2004 | Lee et al. | 704/207 |
| 2005/0015244 | A1 * | 1/2005 | Kitao et al. | 704/226 |
| 2005/0171769 | A1 | 8/2005 | Naka et al. | |
| 2005/0182620 | A1 * | 8/2005 | Kabi et al. | 704/216 |

FOREIGN PATENT DOCUMENTS

| | | |
|---|---|---|
| JP | 60-35797 | 2/1985 |
| JP | S63-260250 | 10/1988 |
| JP | S63-281200 | 11/1988 |
| JP | 04-090599 | 3/1992 |
| JP | 09-212195 | 8/1997 |
| JP | H10-091184 | 4/1998 |
| JP | 2000-250568 | 9/2000 |
| JP | 2000-352987 | 12/2000 |
| JP | 2001-306086 | 11/2001 |
| JP | 2001-326953 | 11/2001 |
| JP | 2002-162982 | 6/2002 |

OTHER PUBLICATIONS

An autocorrelation pitch detector and voicing decision with confidence measures developed for noise-corrupted speech Krubsack, D.A.; Niederjohn, R.J. Signal Processing, IEEE Transactions on [see also Acoustics, Speech, and Signal Processing, IEEE Transactions on] (1053-587X) Feb. 1991. vol. 39,Iss.2;p. 319-329.*

Krubsack, D.A.; Niederjohn, R.J.; , "An autocorrelation pitch detector and voicing decision with confidence measures developed for noise-corrupted speech," Signal Processing, IEEE Transactions on , vol. 39, No. 2, pp. 319-329, Feb. 1991 doi: 10.1109/78.80814 URL: http://ieeexplore.ieee.org/stamp/stamp.jsp?tp=&arnumber=80814&isnumber=2656.*

Wu, Mingyang; Wang, DeLiang; Brown, Guy J.; , "A multi-pitch tracking algorithm for noisy speech," Acoustics, Speech, and Signal Processing (ICASSP), 2002 IEEE International Conference on , vol. 1, no., pp. I-369-I-372, May 13-17, 2002 doi: 10.1109/ICASSP.2002.5743731 URL: http://ieeexplore.ieee.org/stamp/stamp.jsp?tp=&arnumber=5743731&isnumber=574363.*

Mingyang Wu; DeLiang Wang; Brown, G.J.; , "A multipitch tracking algorithm for noisy speech," Speech and Audio Processing, IEEE Transactions on , vol. 11, No. 3, pp. 229-241, May 2003 doi: 10.1109/TSA.2003.811539 URL: http://ieeexplore.ieee.org/stamp/stamp.jsp?tp=&arnumber=1208292&isnumber=27190.*

Shimamura, T.; Kobayashi, H.; , "Weighted autocorrelation for pitch extraction of noisy speech," Speech and Audio Processing, IEEE Transactions on , vol. 9, No. 7, pp. 727-730, Oct. 2001 doi: 10.1109/89.952490 URL: http://ieeexplore.ieee.org/stamp/stamp.jsp?tp=&arnumber=952490&isnumber=20591.*

Chinese Office Action mailed Aug. 11, 2006.

Chinese Office Action mailed Jun. 16, 2006.

Lee, I. D. et al., "A Voice Activity Detection Algorithm for Communication Systems with Dynamically Varying Background Acoustic Noise", *Vehicular Technology Conference*, May 18, 1998, pp. 1214-1218.

"Universal Mobile Telecommunications System (UMTS); AMR Speech Codec; Voice Activity Detector for AMR Speech Traffic Channels; ETSI TS 126 094", *European Telecommunications Standards Institute*, Jun. 2002, 26 Pages.

"Universal Mobile Telecommunications System (UMTS); AMR Speech Codec; Transcoding Functions: ETSI TS 126 090", European Telecommunications Standards Institute, Jun. 2002, 56 Pages.

3rd Generation Partnership Project; Technical Specification Group Services and System Aspects; Mandatory Speech Codec speech processing functions AMR speech codec; Voice Activity Detector (VAD), *3GPP TS 26.094* v3.0.0, 1999, 30 pages.

Mauuary, L./Monne, J. (1993): "Speech/non-speech detection for voice response systems," in EUROSPEECH'93, 1097-1100.

Office Action dated Apr. 1, 2009, for U.S. Appl. No. 11/019,314 (17 pgs).

Japanese Patent Office Action dated Apr. 28, 2009, issued in Japanese Patent Application No. P2003-430973.

Japanese Patent Office Action dated May 12, 2009, issued in Japanese Patent Application No. P2004-020351, with English translation (3 pages).

Office Action dated Nov. 18, 2009, issued in U.S. Appl. No. 11/019,314, 19 pages.

Office Action dated Nov. 2, 2011, issued in U.S. Appl. No. 11/019,314, 22 pages; U.S. Patent and Trademark Office, Alexandria, VA.

Japanese Notice of Allowance issued Mar. 30, 2010, in Japanese Patent Application No. P2003-430973 (5 pgs., with translation).

Office Action dated May 24, 2011, issued in U.S. Appl. No. 11/019,314, 24 pages.

Advisory Action dated Feb. 8, 2012, issued in U.S. Appl. No. 11/019,314, 4 pages; U.S. Patent and Trademark Office, Alexandria, VA.

* cited by examiner

APPARATUS AND METHOD FOR VOICE ACTIVITY DETECTION

BACKGROUND OF THE INVENTION

1. Field of the Invention

The present invention relates to a voice activity detection apparatus and a voice activity detection method.

2. Related Background Art

Discontinuous transmission (DTX) is a technology commonly used in telephony services over the mobile and in telephony services over the Internet for the purpose of reducing transmission power or saving transmission bandwidth. In the DTX operation, inactive period in an input signal, such as silence and background noise, may be transmitted at lower bitrate compared with the bitrate for active period containing speech, music or special tones, or transmission may be stopped during such inactive period. Voice activity detection (VAD), which is one of the key components of DTX operation, decides whether the current period of the input signal to be encoded contains only inactive information or not.

For example, the VAD apparatus described in patent document 1 listed below uses an autocorrelation of an input signal by taking advantage of the periodicity in human voice. More specifically, this VAD apparatus computes a delay at which the maximum autocorrelation value of an input signal within an (pre-determined) interval is obtained, and classifies the input signal as active if the obtained delay falls in the range of the pitch period of human voice, and the input signal inactive if the obtained delay is out of that range.

Furthermore, the VAD apparatus described in non-patent document 1 listed below estimates a background noise from an input signal and decides whether the input signal is active or inactive based on the ratio of the input signal to the estimated noise (SNR). More specifically, this VAD apparatus computes a delay at which the maximum autocorrelation value of an input signal within a (pre-determined) interval is obtained, and a delay at which the maximum weighted autocorrelation value of the input signal is obtained, estimates a background noise level adapting the estimation method on the basis of the continuity of these delays (i.e., small variation of subsequent delays for a pre-determined period of time), thereupon decides that the input signal is active if the SNR is equal to or greater than a threshold adaptively computed based on the estimated background noise level, or that the input signal is inactive if the SNR is smaller than the threshold.

[Patent Document 1] Japanese Unexamined Patent Publication No. 2002-162982

[Non-patent Document 1] 3GPP TS 26.094 V3.0.0 (http://www.3gpp.org/ftp/Specs/html-info/26094.htm)

SUMMARY OF THE INVENTION

However, the conventional VAD described above have posed problems as described below. That is, the VAD apparatuses using the above technologies decide that the inactivity of an input signal based on the single autocorrelation value or the single delay at which the maximum autocorrelation value is obtained, and therefore can not accurately decide inactivity of an input signal containing many non-periodic components and/or containing a plurality of different periodic components.

The object of the present invention is to provide a VAD apparatus and a VAD method that solve the above problem and are capable of accurately performing the decision of inactivity for an input signal having many non-periodic components and/or a plurality of mixed different periodic components.

In order to solve the above problem, the VAD apparatus of the present invention comprises: an autocorrelation calculating means for calculating autocorrelation values of an input signal; a delay calculating means for finding a plurality of delays at each of which corresponding autocorrelation value calculated by said autocorrelation calculating means become maximum; a characteristic deciding means for deciding a characteristic of said input signal on the basis of said plurality of delays calculated by said delay calculating means; and an activity detection means for deciding the activity of the input signal on the basis of the result of decision by said characteristic deciding means.

Furthermore, in order to solve the above problem, the VAD method of the present invention comprises: an autocorrelation calculating step of calculating autocorrelation values of an input signal; a delay calculating step of finding a plurality of delays at each of which corresponding autocorrelation value calculated in said autocorrelation calculating step become maximum; a characteristic deciding step of deciding a characteristic of said input signal on the basis of said plurality of delays calculated in said delay calculating step; and an activity decision step of deciding the activity of the input signal on the basis of the result of decision in said characteristic deciding step.

A plurality of delays at each of which associated autocorrelation value of an input signal become maximum are calculated and the activity detection for the input signal is performed on the basis of the plurality of delays, whereby it makes possible for activity detection to take a plurality of periodicity in the input signal into account.

Furthermore, in the VAD apparatus of the present invention, the activity decision means preferably performs the activity decision for the input signal on the basis of the result of the decision by the characteristic deciding means and the input signal itself.

Likewise, in the VAD method of the present invention, the activity decision step preferably performs the activity decision for the input signal on the basis of the result of decision by the characteristic deciding step and the input signal itself.

Using the input signal in addition to the result of decision by the characteristic deciding means or the characteristic deciding step makes the result of activity detection more precisely. For example, it may be possible to decide the input signal as active based on the activity history of the past input signal, while the result of the characteristic deciding means or the characteristic deciding step indicates the input signal is inactive.

Furthermore, the VAD apparatus of the present invention preferably further comprises a noise estimating means for estimating a background noise level from the input signal, wherein the activity decision means makes the activity decision based on the result of decision by the characteristic deciding means, the input signal, and a noise signal estimated by the noise estimating means.

Using the input signal and the estimated noise signal in addition to the result of decision by the characteristic deciding means makes possible to perform the activity decision based on the signal to estimated noise ratio.

Furthermore, in the activity decision apparatus of the present invention, the noise estimating means preferably adapts the method of estimating a noise on the basis of the result of decision by the activity decision means.

The adaptive noise estimating method based on the result of decision by the activity decision means requires more precise procedure for noise estimation. For example, the activity decision means reduces the level of a noise estimated by the noise estimating means when continuing to perform the decision on being the sound-present state, whereby the signal components are emphasized with respect to the noise.

For example, the level of input signal relative to the level of the estimated noise become large by reducing the level of the estimated noise by the noise estimating means when the consecutive.

Furthermore, in the activity decision apparatus to the present invention, the delay calculating means preferably calculates the plurality of delays in order of the magnitude of autocorrelation values.

The plural delays are calculated in order of the magnitude of autocorrelation values, thereby facilitating to calculate the plurality of delays.

Furthermore, in the activity decision apparatus of the present invention, the delay calculating means preferably divides a delay-observation interval into a plurality of intervals and calculates a delay, at which the autocorrelation value becomes the largest, in each of the plurality of intervals.

Likewise, in the activity decision method of the present invention, the delay calculating step preferably divides a delay-observation interval into a plurality of intervals and calculates a delay, at which the autocorrelation value becomes the largest, in each of the plurality of intervals.

A delay-observation interval is divided into a plurality of intervals, and a delay is calculated at which the autocorrelation value becomes the largest in each of the plurality of intervals, whereby delays depending on the various periodic components contained in an input signal may be calculated evenly without leaning to, for example, delays depending on the natural frequency of a vocal band and a wave having a frequency which is an integer multiple of the primary frequency.

Furthermore, in the activity decision apparatus of the present invention, the plurality of intervals are preferably represented by $2^{i-1}\cdot$min_t to $2^{o}\cdot$min_t (i: natural number) where min_t is the starting point (i.e., shortest delay) of the delay-observation interval.

Such interval division for a periodic signal enables delays, corresponding to twice the period of the periodic signal, to be detected efficiently, and thereby it becomes possible to more accurately perform the decision for the activity.

The activity decision apparatus or activity decision method of the present invention calculates a plurality of delays at which autocorrelation values of an input signal become maximums, and performs the decision for the activity on the basis of the plurality of delays, whereby it is made possible to perform the decision for the activity in consideration of a plurality of periodic components contained in the input signal. As a result, it becomes possible to accurately perform the decision for the sound interval/silence interval also in terms of an input signal containing signals having many aperiodic components and/or containing a plurality of different periodic components in a mixed state.

DESCRIPTION OF THE PREFERRED EMBODIMENTS

First Embodiment

An activity decision apparatus according to the first embodiment of the present invention will be described with reference to the drawings.

Figure 1:
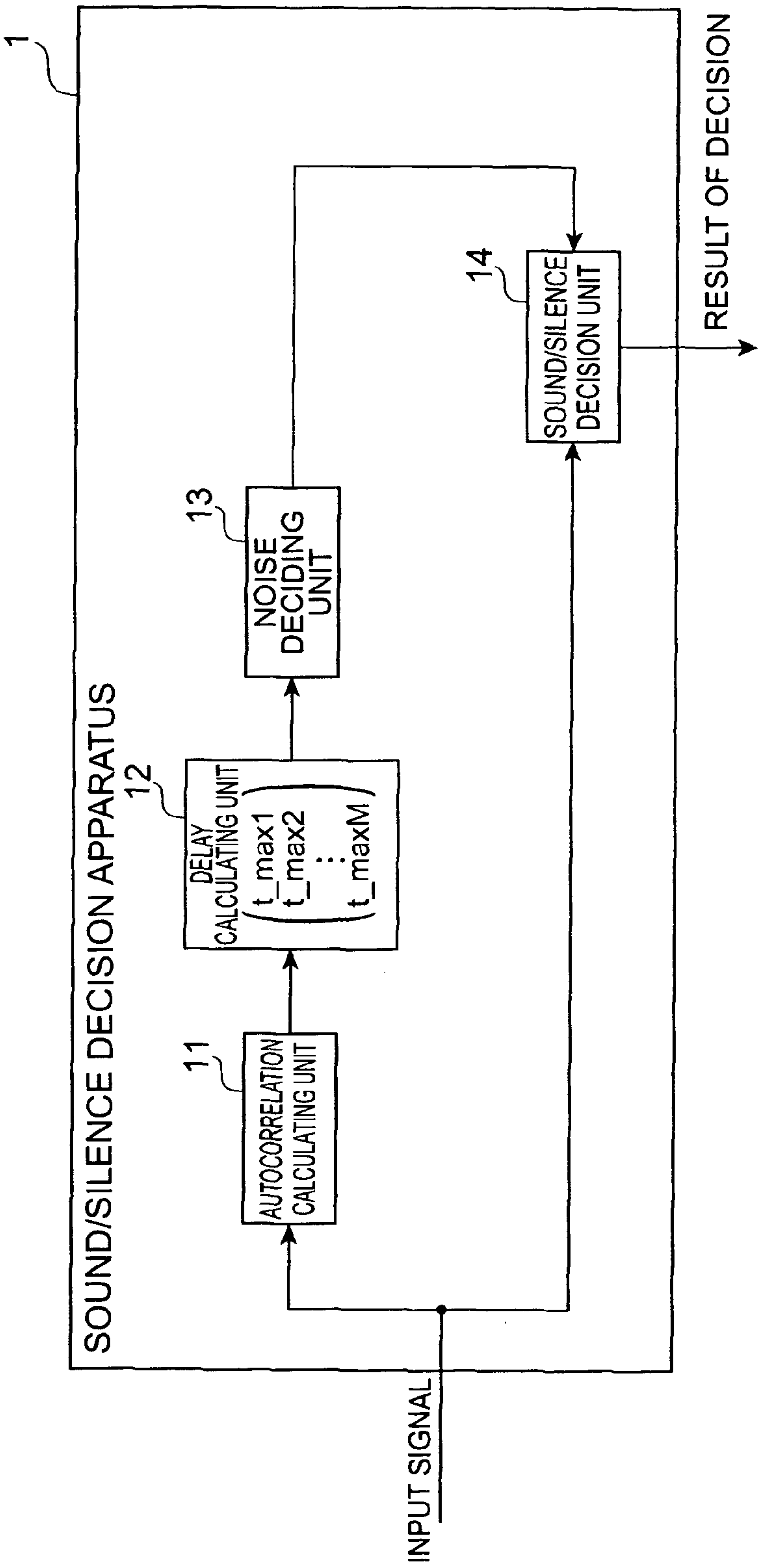
FIG. 1 shows a configuration diagram of the sound/silence decision apparatus according to the first embodiment.

First, the configuration of the activity decision apparatus according to this embodiment is explained. FIG. 1 is a diagram of the activity decision apparatus according to this embodiment The activity decision apparatus 1 is physically configured as a computer system being comprised of a central processing unit (CPU), a memory, input devices such as a mouse and a keyboard, a display, a storage device such as a hard disk, and a radio communication unit for performing wireless data communication with external equipment, etc. Furthermore, the activity decision apparatus 1 is functionally provided with, as shown in FIG. 1, an autocorrelation calculating unit 11 (autocorrelation calculating means), a delay-calculating unit 12 (delay calculating means), a noise deciding unit 13 (characteristic deciding means), and an activity decision unit 14 (activity decision means). Each component of the activity decision apparatus 1 is described below in detail.

The autocorrelation calculating unit 11 calculates autocorrelation values of an input signal. More specifically, the autocorrelation calculating unit 11 calculates autocorrelation values c(t) of an input signal x(n) according to the following equation (1).

$$c(t)=\frac{\sum_{n=0}^{N-1}x(n)x(n-t)}{\sqrt{\sum_{n=0}^{N-1}x^2(n)}\sqrt{\sum_{n=0}^{N-1}x^2(n-t)}} \quad (1)$$

Where, x(n) (n=0, 1, . . . , N) is the n-th value obtained by sampling a input signal every fixed time interval (e.g., 1/8000 sec) over a fixed time (e.g., 20 msec), and t denotes delay. Furthermore, autocorrelation value c(t) is obtained as discrete values every fixed time interval (e.g., 1/8000 sec) over a fixed time (e.g., 18 msec).

The autocorrelation calculating unit 11 is not necessarily required to strictly calculate autocorrelation values according to the above equation (1). For example, the autocorrelation calculating unit 11 may be designed to calculate autocorrelation values on the basis of perceptually weighted input signal as widely used in speech encoders. In addition, the autocorrelation calculating unit 11 may be designed to weight autocorrelation values calculated on the basis of an input signal, and output weighted autocorrelation values.

Figure 2:
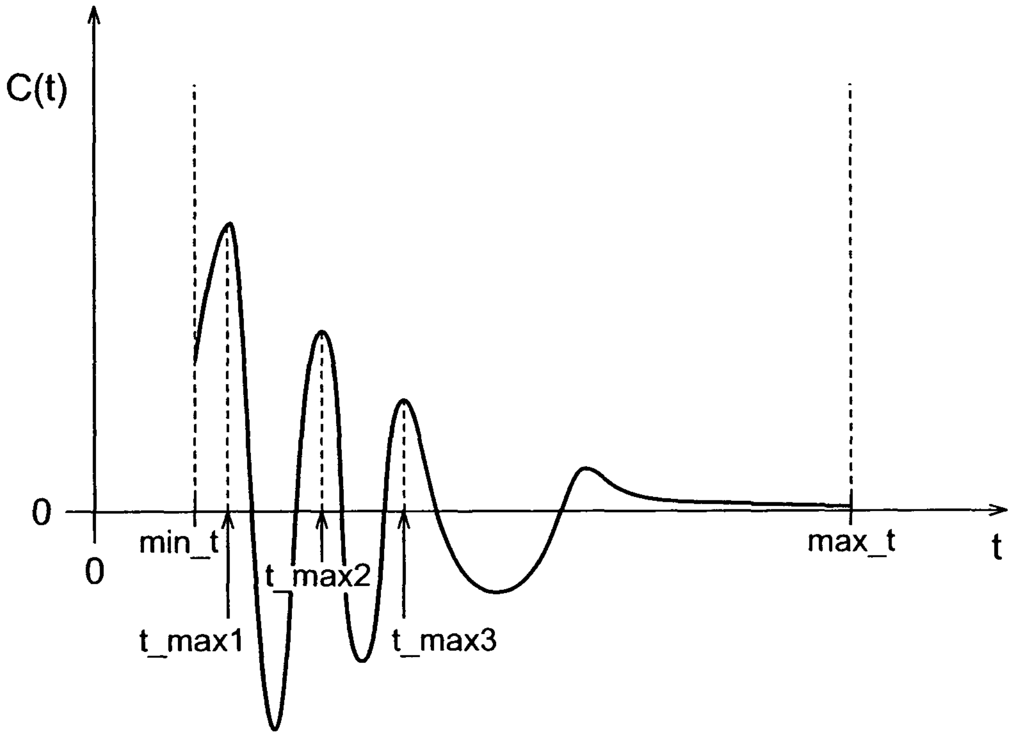
FIG. 2 shows a specific example of delay calculation.

The delay-calculating unit 12 calculates a plurality of delays at which autocorrelation values calculated by the autocorrelation calculating unit 11 become maximums. More specifically, the delay calculating unit 12 searches autocorrelation values within a predetermined interval and calculates M delays, at which autocorrelation values become maximums, in order of their magnitude. That is, as shown in FIG. 2, the delay calculating unit 12 calculates successively, in a delay-observation interval between min_t and max_t (e.g., between 18 and 143 in case of AMR), a delay t_max1, at which the autocorrelation value becomes the largest, out of delays at which autocorrelation values become maximums, a delay t_max2, at which the autocorrelation value becomes the second largest, out of delays at which autocorrelation values become maximums, and a delay t_max3 at which the autocorrelation value becomes the third largest, out of delays at which autocorrelation values become maximums (here described the case of M=3).

Returning to FIG. 1, the noise-deciding unit 13 decides whether the input signal is a noise or not (a characteristic of the input signal) on the basis of the plurality of delays calculated by the delay-calculating unit 12. The noise deciding unit 13 decides whether the input signal is a noise or not, using, for example, time variations t_maxi(k) ($1 \leqq i \leqq M$, $1 \leqq k \leqq K$) of the plurality of delays t_maxi ($1 \leqq i \leqq M$) calculated by the delay calculating unit 12, where k is a dependent variable representing time. More specifically, the noise-deciding unit 13 decides that the input signal is not a noise if a state, which meets the condition expressed by equation (2) continues for a pre-determined time (qualitatively speaking, if a state of small variation of delays continues for a pre-determined time). Conversely, the noise-deciding unit 13 decides that the input signal is a noise if a state which meets the condition expressed by equation (2) does not continue for a fixed time.

$$\min_{\substack{i=1\sim M\\ j=1\sim M}} \{|\text{t\_max}\,i(k) - \text{t\_max}\,j(k-1)|\} \leq d \tag{2}$$

In equation (2), d is a predetermined threshold of the delay difference. The noise deciding unit 13 may decide whether the input signal is a noise or not using a procedure other than the above procedure provided that it decides whether the input signal is a noise or not on the basis of the plurality of delays.

The activity decision unit 14 performs the decision for the activity in terms of the input signal on the basis of the result of decision by the noise-deciding unit 13 as well as the input signal. The activity decision unit 14 performs the decision for the activity of the input signal using, for example, the result of decision by the noise-deciding unit 13 and the result of analysis of the input signal (power, spectrum envelope, the number of zero-crossing, etc.). Various techniques widely known may be adopted to perform the decision for the activity in terms of the input signal using the result of decision by the noise deciding unit 13 and the result of analysis of the input signal. In this statement, "inactive" refers to a sound meaningless as information, such as silence and background noise. On the other hand, "active" refers to a sound meaningful as information, such as voice, music or tones.

Figure 3:
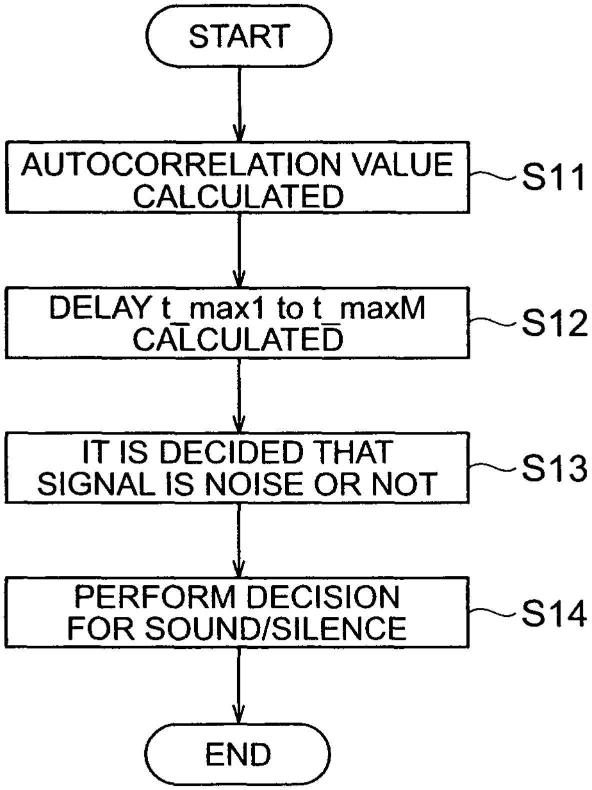
FIG. 3 shows a flow chart depicting the operation of the sound/silence decision apparatus according to the first embodiment.

Next, the operation of the activity decision apparatus according to this embodiment is described and at the same time the activity decision method according to the embodiment of the present invention is also described. FIG. 3 is a flow chart depicting the operation of the activity decision apparatus according to this embodiment.

After an input signal is inputted to the activity decision apparatus 1, autocorrelation values of the input signal are calculated by the autocorrelation calculating unit 11 (S11) first. More specifically, autocorrelation values c(t) of the input signal x(n) are calculated according to equation (1) described above.

After autocorrelation values of the input signal are calculated by the autocorrelation calculating unit 11, a plurality of delays, at which autocorrelation values calculated by the autocorrelation calculating unit 11 become maximums, are calculated by the delay calculating unit 12 (S12). More specifically, autocorrelation values in a predetermined delay-observation interval are searched and M delays (delays of t_max1 to t_maxM) at which autocorrelation values become maximums are calculated in order of their magnitude.

After the plurality of delays are calculated by the delay calculating unit 12, it is decided by the noise deciding unit 13 whether the input signal is a noise or not (a characteristic of the input signal) on the basis of the plurality of delays calculated by the delay calculating unit 12 (S13). More specifically, if a state that meets the condition shown in the above equation (2) continues for a predetermined time, it is decided that the input signal is not a noise. Conversely, if a state that meets the condition shown in equation (2) does not continue for a fixed time, it is decided that the input signal is a noise.

After it is decided by the noise deciding unit 13 whether the input signal is a noise or not, there is performed the decision for the activity in terms of the input signal by the sound/silence decision unit 14 on the basis of the result of decision by the noise deciding unit 13 and the input signal (S14). More specifically, the decision for the activity in terms of the input signal utilizes the result of decision by the noise deciding unit 13 and the result of analysis of the input signal (power, spectrum envelope, the number of zero-crossings, etc.).

Next, the function and effect of the activity decision apparatus according to this embodiment is described. In the activity decision apparatus 1 according to this embodiment, the delay calculating unit 12 calculates a plurality of delays t_max1 to t_maxM at which autocorrelation values become maximums, and the noise deciding unit 12 decides whether the input signal is a noise or not the basis of the plurality of delays t_max1 to t_maxM, and the activity decision unit 14 performs the decision for the activity on the basis of the result of decision by the noise deciding unit 13. Thus, it makes possible to perform the decision for the activity in terms of the input signal in consideration of a plurality of periodic components contained in the input signal. As a result, the activity decision is capable of an input signal containing signals having many aperiodic components and/or containing a plurality of different periodic components.

Furthermore, in the activity decision apparatus 1 according to this embodiment, the activity decision unit 14 performs the decision for the activity in terms of the pertinent input signal using not only the result of decision by the noise-deciding unit 13 but also the input signal. Thus, a finer decision procedure may be incorporated as compared with the case of performing the decision for the activity in terms of the input signal using only the result of decision by the noise deciding unit 13. That is, for example, it becomes possible to include such a decision procedure that although it is decided by the noise deciding unit 13 that the input signal is a noise, it is decided that the input signal is active when the history of the input signal meets a fixed condition. In this connection, the activity decision unit 14 may be configured in such a manner as to perform the decision for the activity in terms of the input signal without using the result of analysis of the input signal but using only the result of decision by the noise deciding unit 13. In this case, a finer decision procedure as described above cannot be included, and the decision procedure will be simple.

Furthermore, in the activity decision apparatus 1 according to this embodiment, the delay calculating unit 12 calculates a plurality of delays in order of the magnitude in terms of autocorrelation value when calculating the plurality of delays. Thus, a plurality of delays can be calculated easily as compared with the case of adopting other calculating method.

Second Embodiment

Figure 4:
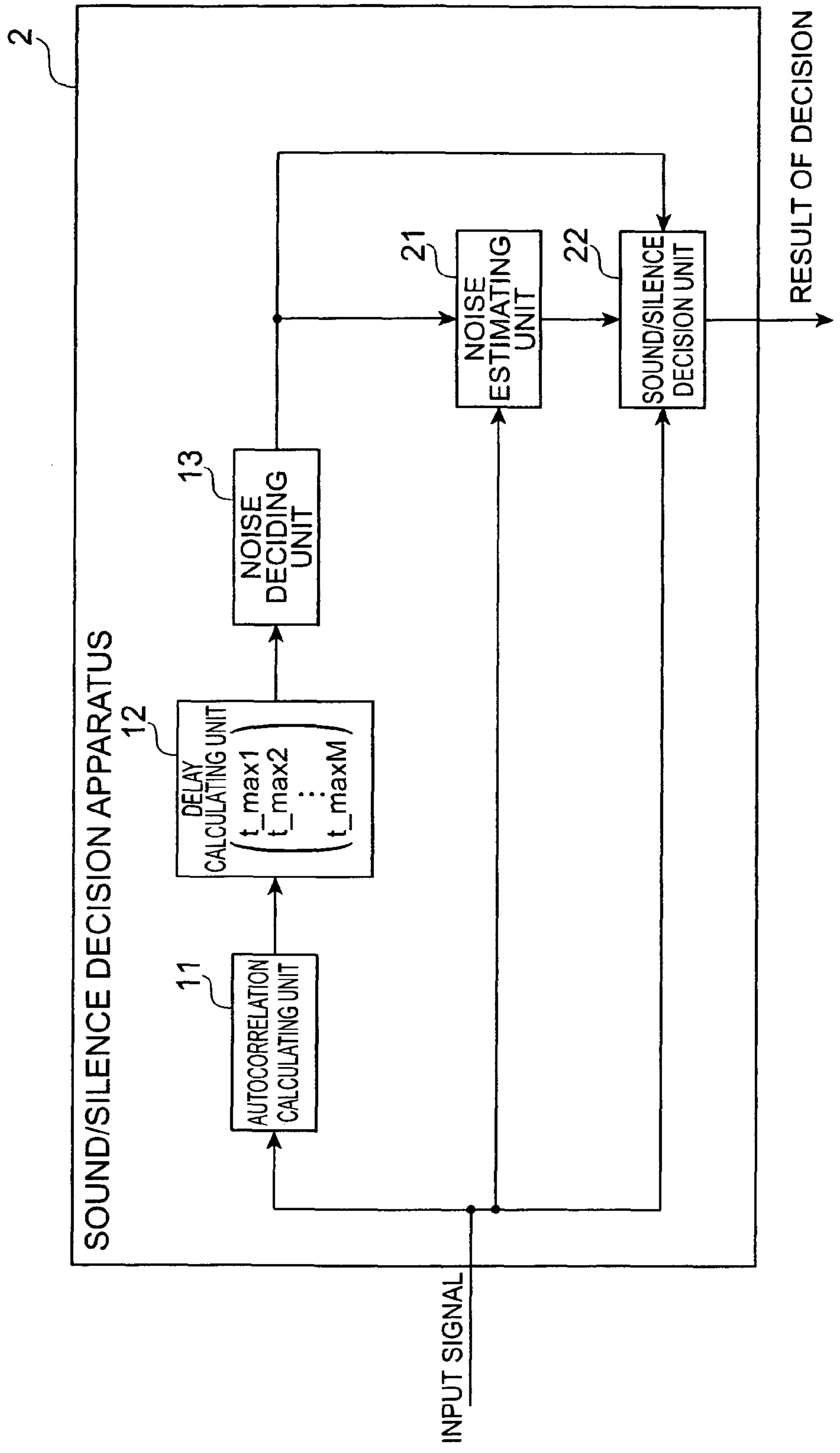
FIG. 4 shows a configuration diagram of the sound/silence decision apparatus according to the second embodiment.

Next, an activity decision apparatus according to the second embodiment of the present invention is described with reference to the drawings. First, the configuration of the activity decision apparatus according to this embodiment is explained. FIG. 4 is a configuration diagram of the activity decision apparatus according to this embodiment. The activity decision apparatus 2 according to this embodiment is different from the activity decision apparatus 1 according to the first embodiment described above in that the activity decision apparatus 2 further comprises a noise estimating unit 21 (noise estimating means) for estimating a noise from an input signal and the activity decision unit 22 performs the decision for the activity using a noise estimated by the noise estimating unit 21.

The activity decision apparatus 2 is functionally configured, as shown in FIG. 4, to be provided with an autocorrelation calculating unit 11, a delay calculating unit 12, a noise deciding unit 13, a noise estimating unit 21, and an activity decision unit 22. The autocorrelation calculating unit 11, delay calculating unit 12, and noise deciding unit 13 have functions similar to those of the autocorrelation calculating unit 11, delay calculating unit 12, and noise deciding unit 13 in the activity decision apparatus 1 according to the first embodiment, respectively.

The noise estimating unit 21 estimates a noise from an input signal. More specifically, the noise estimating unit 21 estimates a noise according to, for example, the following equation (3).

$$\text{noise}_{m+1}(n)=(1-\alpha)\cdot\text{noise}_m(n)+\alpha\cdot\text{input}_{m-1}(m) \quad (1)$$

Where, "noise" is an estimated noise, "input" is an input signal, "n" is an index representing a frequency band, "m" is an index representing a time (frame), and "α" is a coefficient. That is, $\text{noise}_m(n)$ represents an estimated noise at a time (frame) m in the n-th frequency band. The noise estimating unit 21 changes the coefficient α in the above equation (3) in accordance with the result of decision by the noise deciding unit 13. That is, when it is decided by the noise deciding unit 13 that the input signal is not a noise, the noise estimating unit 21 sets the coefficient α in the above equation (3) to 0 or a value α1 near 0 in such a manner as to cause no increase in the power of the estimated noise. On the other hand, when it is decided by the noise deciding unit 13 that the input signal is a noise, the noise estimating unit 21 sets the coefficient α in the above equation (3) to 1 or a value α2 (α2>α1) near 1 so as to cause the estimated noise to be close to the input signal. The noise estimating unit 21 may be designed to estimate a noise from the input signal using a procedure other than the above procedure.

The activity decision unit 22 performs the decision for the activity on the basis of the result of decision by the noise deciding unit 13, the input signal, and the noise estimated by the noise estimating unit 21. More specifically, activity decision unit 22 calculates, for example, an S/N ratio (more accurately, the integrated value or mean value of S/N ratios in frequency bands) from the noise estimated by the noise estimating unit 21 and the input signal. Furthermore, the activity decision unit 22 compares the calculated S/N ratio and a predetermined threshold value and decides that the input signal is in a sound-present state when the S/N ratio is larger than the threshold value or that the input signal is in a silent state (in a sound-absent state) when the S/N ratio is equal to or less than the threshold value. The threshold value has been set in such a manner as to vary with the result of decision by the noise deciding unit 13. That is, the threshold value in the case where the noise deciding unit 13 decides that the input signal is "not a noise", has been set so as to be less than that in the case where the noise deciding unit 13 decides that the input signal is a noise. For this reason, in the case where the noise deciding unit 13 decides that the input signal is not a noise, the possibility of extracting signals having small S/N ratios (i.e., signals buried in the noise) as speech sound signals increases. The sound/silence decision unit 22 may be designed to decide whether the input signal is in a sound-present state or in a silent state using a procedure other than the above procedure. That is, for example, it may be designed that the above threshold values are made to be the same value irrespective of the result of decision by the noise deciding unit 13, and the activity decision unit 21 may perform the decision for the activity in terms of the input signal on the basis of the input signal and the noise estimated by the noise estimating unit 21.

Figure 5:
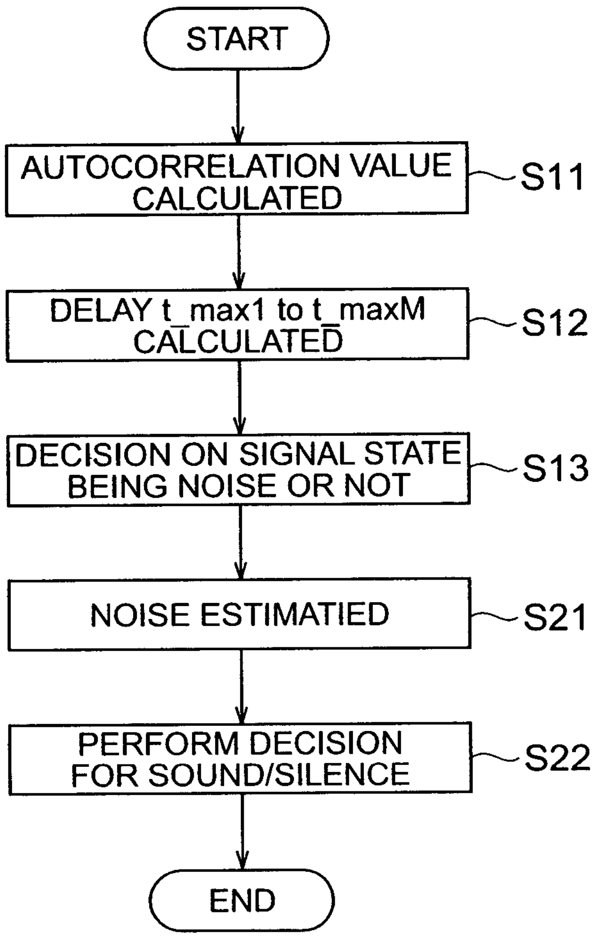
FIG. 5 shows a flow chart depicting the operation of the sound/silence decision apparatus according to the second embodiment.

Next, the operation of the activity decision apparatus according to this embodiment is described. FIG. 5 is a flow chart showing the operation of the activity decision apparatus according to this embodiment. The steps of calculating autocorrelation values (S11), calculating delays t_max1 to t_maxM (S12), and decision on a signal state being a noise or not (S13) are similar to those of the sound/silence decision apparatus 1 according to the first embodiment.

After the steps S11 to S13, a noise is estimated from the input signal by the noise estimating unit 21 (S21). More specifically, a noise is estimated according to the above equation (3). The coefficient α in the above equation (3) varies with the result of decision by the noise deciding unit 13. That is, when it is decided by the noise deciding unit 13 that the input signal is not a noise, the coefficient α in the above equation (3) is set to 0 or a value α1 close to 0 not so as to increase the power of the estimated noise. On the other hand, when it is decided by the noise deciding unit 13 that the input signal is a noise, the coefficient α in the above equation (3) is set to 1 or a value α2 (α2>α1) close to 1 so as to make the estimated noise to be close to the input signal. The step of estimating a noise (S21) is not limited to being implemented after the steps S11 to S13, but may be implemented in parallel with the steps S11 to S13.

After a noise is estimated by the noise estimating unit 21, the decision for the activity in terms of the input signal is made by the activity decision unit 22 on the basis of the result of decision by the noise deciding unit 13, the input signal, and the noise estimated by the noise estimating unit 21 (S22). More specifically, for example, an S/N ratio is calculated from the noise estimated by the noise estimating unit 21 and the input signal, and the calculated S/N ratio is compared with a predetermined threshold value. It is then decided that the input signal is in active when the S/N ratio is larger than the threshold value or that the input signal is inactive when the S/N ratio is equal to or less than the threshold value.

Next the effect of the activity decision apparatus according to this embodiment is described. The activity decision apparatus 2 according to this embodiment has an advantage as shown below in addition to the effect of the activity decision apparatus 1 according to the above embodiment. That is, in the activity decision apparatus 2, the noise estimating unit 21 estimates a noise from an input signal, and the activity decision unit 22 decides whether the input signal is in active or inactive on the basis of the result of decision by the noise deciding unit 13, the input signal, and the noise estimated by the noise estimating unit 21. Thus, it makes possible to accurately decide whether an input signal is in a sound-present state or in a silent state on the basis of the S/N ratio. Furthermore, the noise estimating unit 21 changes the coefficient α of the noise estimating equation (equation (3) described above) in accordance with the result of decision by the noise deciding unit 13, and thereby it becomes possible to more accurately decide whether an input signal is in a sound-present state or in a silent state.

Third Embodiment

Figure 6:
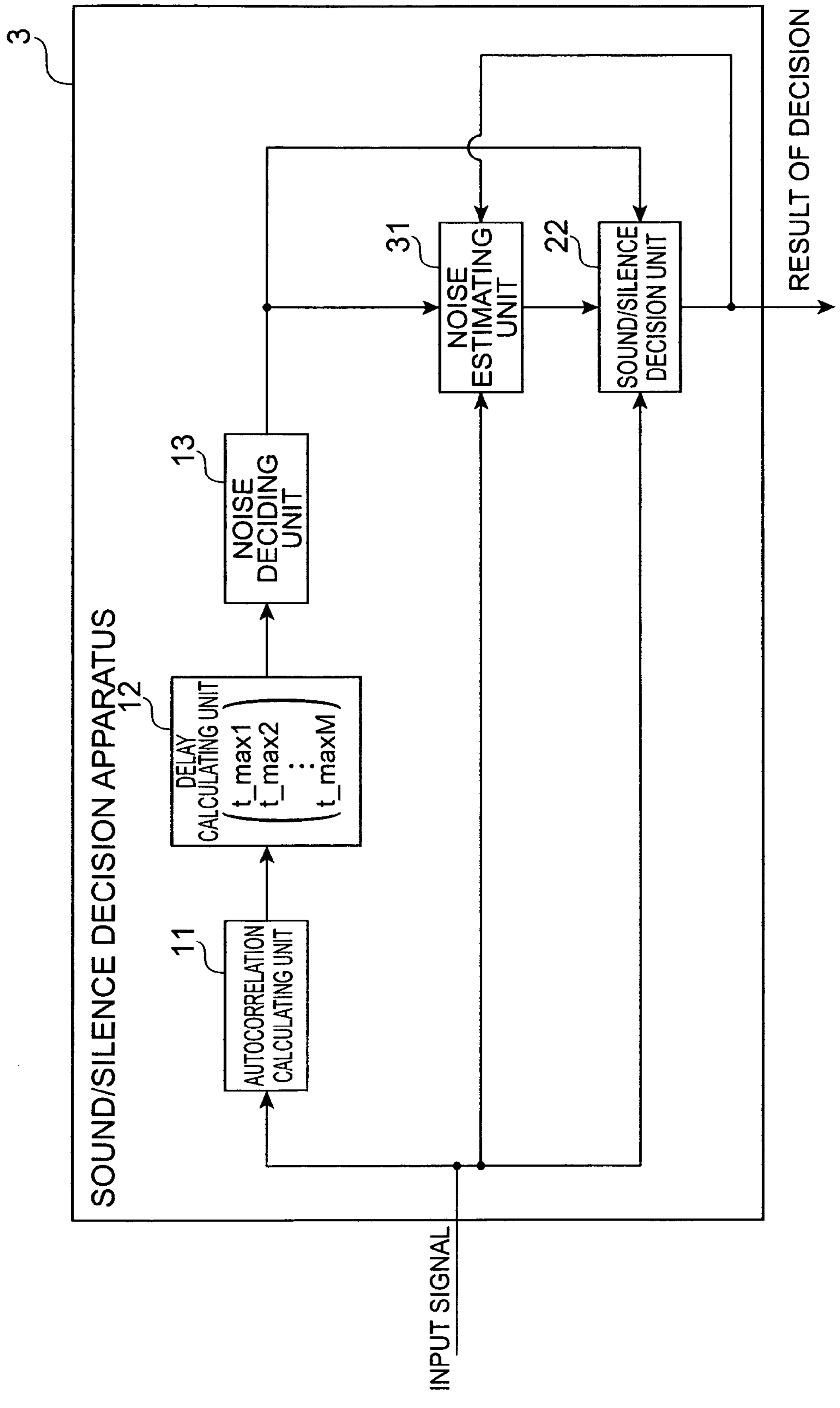
FIG. 6 shows a configuration diagram of the sound/silence decision apparatus according to the third embodiment.

Next, an activity decision apparatus according to the third embodiment of the present invention is described with reference to the drawings. FIG. 6 is a configuration diagram of the activity decision apparatus according to this embodiment. The activity decision apparatus 3 according to this embodiment is different from the activity decision apparatus 2 according to the above second embodiment in that the noise estimating unit 31 changes the method of estimating a noise on the basis of the result of decision by the activity decision unit 22.

The activity decision apparatus 3 is functionally configured, as shown in FIG. 6, to comprise an autocorrelation calculating unit 11, a delay calculating unit 12, a noise deciding unit 13, a noise estimating unit 31, and a sound/silence decision unit 22. The autocorrelation calculating unit 11, delay calculating unit 12, noise deciding unit 13, and sound/silence decision unit 22 have functions similar to those of the autocorrelation calculating unit 11, delay calculating unit 12, noise deciding unit 13, and sound/silence decision unit 22 in the activity decision apparatus 2 according to the second embodiment, respectively.

The noise estimating unit 31 estimates a noise from an input signal like the noise estimating unit 21 in the activity decision apparatus 2. However, the noise estimating unit 31 changes the method of estimating a noise particularly on the basis of the result of decision by the activity decision unit 22. More specifically, the noise estimating unit 31 estimates a noise according to the above equation (3) first. After that, the noise estimating unit 31 outputs a value, obtained by multiplying the noise calculated according to equation (3) by a coefficient β decided according to the history of the result of decision by the activity decision unit 22, as an ultimate noise. For example, the noise estimating unit 31 makes the signal distinctive by setting the coefficient β to a value less than 1 when the activity decision unit 22 continues to output, for more than a fixed time, the result of decision that the signal is a speech sound signal, and sets the coefficient β to 1 in other cases. The noise estimating unit 31 may change the method of estimating a noise using a procedure other than the above procedure.

The activity decision apparatus 3 according to this embodiment has an advantage as shown below in addition to the advantage of the activity decision apparatus 2 according to the above embodiment. That is, in the activity decision apparatus 3, the noise estimating unit 31 changes the method of estimating a noise on the basis of the result of decision by the activity decision unit 22. Thus, a more detailed decision procedure may be included. That is, for example, the activity decision unit 22 attempts to actively decrease the level of a noise estimated by the noise estimating unit 31 when continuing to decide that an input signal is a speech sound signal, and thereby the signal components are emphasized in contrast to the noise.

The delay calculating unit 12 of the activity decision apparatus 1, 2 or 3 may be designed to calculate a plurality of delays using a procedure as shown below. That is, the delay calculating unit divides a delay-observation interval into a plurality of intervals and calculates a delay, at which the autocorrelation value becomes the largest, in each of the plurality of intervals. In this case, the plurality of intervals are decided to be $2^{i-1}\cdot$min_t to $2^{i}\cdot$min_t (i: natural number) where min_t is the shortest delay within the interval.

Figure 7:
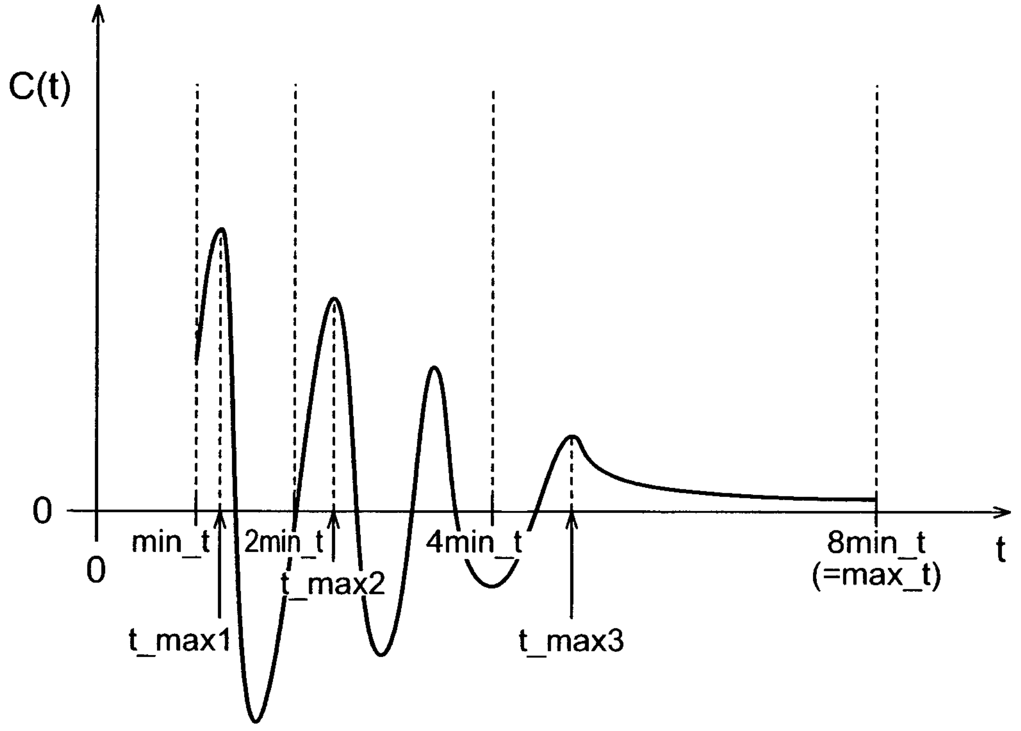
FIG. 7 shows a specific example of delay calculation.

More specifically, as shown in FIG. 7, the delay calculating unit 12 divides a delay-observation interval between min_t and max_t into a plurality of intervals doubling accessibly like min_t to 2·min_t, 2·min _t to 4·min_t, and 4·min_t to 8·min_t. After that, a delay t_max1 at which the autocorrelation value becomes the largest in the interval between min_t and 2·min_t, a delay t_max2 at which the autocorrelation value becomes the largest in the interval between 2·min_t and 4·min_t, a delay t_max3 at which the autocorrelation value becomes the largest in the interval between 4·min_t and 8·min_t are calculated successively (here described the case of M=3). For example, in case of AMR, since min_t is 18, a delay at which the autocorrelation value becomes the largest is obtained in each of the intervals [18, 35], [36, 71], and [72, 143].

Such interval division for a periodic signal allows delays, corresponding to twice the period of the periodic signal, to be detected efficiently, and thereby it is possible to more accurately decide whether the signal is a speech sound signal or a silence signal.

The present invention is applicable, for example, in mobile telephone communication or Internet telephony, to an activity decision apparatus for deciding whether an interval is a sound interval where an input signal contains a sound or a silence interval where it is not necessary to transmit any information.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A voice activity decision apparatus comprising:

a processor in communication with a memory, wherein the processor is configured to receive an input signal;

an autocorrelation calculation module stored in the memory and executable with the processor, the autocorrelation calculation module configured to calculate a plurality of autocorrelation values for the input signal, the plurality of autocorrelation values calculated within a predetermined interval;

a delay calculation module stored in the memory and executable with the processor, the delay calculation module configured to receive the autocorrelation values calculated within the predetermined interval by the autocorrelation calculation module, and further configured to identify local maximum valued autocorrelation values within the autocorrelation values, and the delay calculation module further configured to calculate a plurality of delays within the predetermined interval, wherein the delays comprise a respective delay for each of the local maximum valued autocorrelation values;

a noise decision module stored in the memory and executable with the processor, the noise decision module configured to receive the delays, the noise decision module further configured to determine whether variations between the received delays are less than a threshold for at least a predetermined period of time, and further configured to generate a signal characteristic determination that the input signal includes a non-noise portion based upon determination that the variations between the received delays are less than the threshold for the at least the predetermined period of time;

an activity detector module stored in the memory and executable with the processor, the activity detector module configured to receive the signal characteristic determination of the input signal, and further configured to determine a signal activity decision based on the signal characteristic determination; and a noise estimation module stored in the memory and executable with the processor, the noise estimation module configured to receive the input signal and generate a noise estimate for the input signal, wherein the activity detector module is further configured to determine the signal activity decision based on the signal characteristic determination, the input signal, and the noise estimate, and the noise estimation module is further configured to adapt the noise estimate based on the signal activity decision.

2. The system of claim 1, wherein the activity detector module is further configured to determine the signal activity decision based on the input signal and the signal characteristic determination.

3. The system of claim 1, wherein the activity detector module is further configured to receive the input signal and to determine the signal activity decision based on a signal analysis of the input signal and the signal characteristic determination

4. The system of claim 3, wherein the signal analysis of the input signal comprises a signal measurement comprising at least one of a power measurement, a spectrum envelope measurement, a zero-crossing analysis, or a combination thereof.

5. The system of claim 1, wherein the delay calculation module is further configured to calculate the respective delay for each of the local maximum valued autocorrelation values in an order, wherein the order is determined with the delay calculation module based on a magnitude of each of the local maximum valued autocorrelation values.

6. The system of claim 1, wherein the delay calculation module is further configured to divide a delay-observation interval into delay intervals, and the delay calculation module further configured to identify a maximum valued autocorrelation value within each of the delay intervals as one of the local maximum valued autocorrelation values.

7. The system of claim 6, wherein the delay calculation module is further configured to divide the delay-observation interval into a contiguous series of the delay intervals, wherein each successive delay interval in the contiguous series of the delay intervals is longer than the one of the delay intervals that precedes the successive delay interval by a predetermined amount of delay.

8. The system of claim 6, wherein the delay calculation module is further configured to divide the delay-observation interval into a contiguous series of delay intervals, wherein each successive delay interval in the contiguous series of delay intervals is twice as long as the one of the delay intervals that precedes the successive delay interval.

9. The system of claim 6, wherein the delay calculation module is further configured to divide the delay-observation interval into a contiguous series of delay intervals, wherein the delay intervals are of substantially uniform size.

10. The system of claim 1, wherein the signal activity decision is indicative that the input signal is one of noise or speech.

11. The system of claim 1, wherein the noise decision module is further configured to calculate variations between the received delays.

12. The system of claim 11, wherein each of the calculated variations is a difference between the delay of each of the local maximum valued autocorrelation values and the delay of an adjacent local maximum auto correlation value.

13. The system of claim 1, further comprising a noise estimation module configured to adapt a noise estimate so as to generate a lower value of the noise estimate when the activity detector determines that the input signal is in a sound-present state, than when the activity detector determines that the input signal is in a silent state.

14. A non-transitory computer readable storage device for storing a voice activity detection program, the computer readable storage device comprising:

computer program code embodied on said computer readable storage device, wherein the computer program code is executable with a processor, and wherein the computer program code comprises:

computer program code to calculate a plurality of autocorrelation values of an input signal within a predetermined interval;

computer program code to identify local maximum autocorrelation values within the autocorrelation values calculated within the predetermined interval;

computer program code to calculate a delay for each of the local maximum autocorrelation values identified within the predetermined interval to generate a plurality of delays associated with the local maximum autocorrelations values;

computer program code to determine whether variations between the delays associated with the local maximum autocorrelation values are less than a threshold for a predetermined period of time;

computer program code to, in response to determination that the variations between the delays associated with the local maximum autocorrelation values are less than the threshold for the predetermined period of time, generate a signal characteristic determination that the input signal includes a signal component other than noise;

computer program code to determine a signal activity decision based on the signal characteristic determination; computer program code to generate a noise estimate, wherein the computer program code to determine the signal activity decision further comprises computer program code to generate the signal activity decision based on the input signal and the noise estimate; and computer program code to adapt the noise estimate in response to the signal activity decision.

15. The non-transitory computer readable storage device of claim 14, wherein the computer program code to determine the signal activity decision further comprises computer program code to generate the signal activity decision based on both the signal characteristic determination and the input signal.

16. The non-transitory computer readable storage device of claim 14, wherein the computer program code to determine the signal activity decision further comprises computer program code to generate the signal activity decision based on the signal characteristic determination, the input signal, and a signal analysis of the input signal.

17. The non-transitory computer readable storage device of claim 14, wherein the computer program code further comprises:

computer program code to generate a signal measurement of the input signal comprising at least one of a power measurement, a spectrum envelope measurement, a zero-crossing analysis, or a combination thereof; and wherein the computer program code to determine the signal activity decision further comprises computer program code to generate the signal activity decision based on the signal measurement of the input signal, the input signal, and the signal characteristic determination.

18. The non-transitory computer readable storage device of claim 14, wherein the computer program code to generate the noise estimate further comprises computer program code to adjust a present value of the noise estimate based on a combination of a portion of a previous value of the noise estimate and a portion of a current value of the input signal.

19. The non-transitory computer readable storage device of claim 14, wherein the computer program code further comprises:

computer program code to generate a signal to noise ratio based upon a noise estimate of the input signal and the input signal;

computer program code to detect a sound-present state as a function of the signal to noise ratio being greater than a threshold value; and computer program code to detect a sound-silent state as a function of the signal to noise ratio being equal to or less than the threshold value.

20. The non-transitory computer readable storage device of claim 19, wherein the computer program code further comprises:

computer program code to reduce the threshold value in response to detection of the sound-present state; and computer program code to increase the threshold value in response to detection of the sound-silent state.

21. The non-transitory computer readable storage device of claim 14, wherein the computer program code further comprises:

computer program code to divide a delay-observation interval into delay intervals; and wherein the computer program code to identify the local maximum autocorrelation values further comprises computer program code to identify a maximum valued autocorrelation value within each of the delay intervals; and wherein the computer program code to calculate the delay for each of the local maximum autocorrelation values further comprises computer program code to calculate the delay for the maximum valued autocorrelation value within each of the delay intervals.

22. The non-transitory computer readable storage device of claim 21, wherein the computer program code to divide the delay-observation interval into the delay intervals further comprises:

computer program code to divide the delay-observation interval into delay intervals of substantially uniform size.

23. The non-transitory computer readable storage device of claim 21, wherein the computer program code to divide the delay-observation interval into the delay intervals further comprises:

computer program code to divide the delay-observation interval into a contiguous series of delay intervals, wherein each successive one of the delay intervals is longer by a predetermined amount.

24. The non-transitory computer readable storage device of claim 23, wherein the contiguous series of delay intervals has a predetermined length of delay, and wherein each successive one of the delay intervals is a factor of two longer.

25. The non-transitory computer readable storage device of claim 14, further comprising:

computer program code to calculate variations between the delays associated with each of the local maximum autocorrelation values.

26. The computer readable storage device of claim 14, further comprising computer program code to estimate a noise from the input signal, the noise estimated to be a first value when the signal activity decision is that the input signal is in a sound-present state, and the noise estimated to be a second value when the signal activity decision is that the input signal is in a silent state, the first value being lower than the second value.

27. A method for voice activity detection comprising:

calculating with a processor a plurality of autocorrelation values of an input signal, the autocorrelation values calculated within a predetermined interval;

identifying local maximum autocorrelation values within the autocorrelation values calculated within the predetermined interval with the processor;

calculating a delay for each of the local maximum autocorrelation values identified within the predetermined interval with the processor;

generating a plurality of delays associated with the local maximum autocorrelations values with the processor;

determining with the processor whether variations between the delays associated with the local maximum autocorrelation values are less than a threshold for a predetermined period of time;

generating an input signal characteristic determination of the input signal with the processor when determination that the variations between the delays associated with the local maximum autocorrelation values are less than the threshold for the predetermined period of time, the input signal characteristic determination indicative that the input signal includes a signal component other than noise;

generating a noise estimate of the input signal with the processor;

the processor adapting the noise estimate based on a previous signal activity decision; and the processor determining a signal activity decision based on the input signal characteristic determination and consideration of the noise estimate of the input signal.

28. The method of claim 27, wherein generating the input signal characteristic of the input signal further comprises:

comparing each of the variations to a delay difference threshold value;

detecting that an input signal characteristic of the input signal is noise in response to at least one of the variations being greater than the delay difference threshold value; and detecting that the input signal characteristic of the input signal is a voice signal in response to all of the variations being less than or equal to the delay difference threshold value.

29. The method of claim 27, further comprising:

generating a signal analysis of the input signal with the processor, wherein determination of the signal activity decision further includes consideration of the signal analysis of the input signal.

30. The method of claim 29, further comprising:

analyzing the input signal with the processor to generate a signal characteristic measurement associated with the input signal, the analysis comprising at least one of a power measurement, a spectrum envelope measurement, a zero-crossing analysis, or a combination thereof, wherein determination of the signal activity decision further includes consideration of the signal characteristic measurement.

31. The method of claim 27, further comprising:

generating a signal to noise ratio with the processor based upon a noise estimate of the input signal and the input signal;

detecting a sound-present state with the processor based upon the signal to noise ratio being equal to or greater than a threshold value; and detecting a sound-silent state with the processor based upon the signal to noise ratio being less than the threshold value.

32. The method of claim 31, further comprising:

reducing the threshold value with the processor based upon detection of the sound-present state; and increasing the threshold value with the processor based upon detection of the sound-silent state.

33. The method of claim 27, wherein a delay interval of each of the delays is substantially uniform.

34. The method of claim 27, further comprising estimating a noise from the input signal with the processor, the noise characteristic of the input signal estimated to be a first value when the signal activity decision determines that the input signal is a sound-present state, and the noise characteristic of the input signal estimated to be a second value when the signal activity decision determines that the input signal is in a silent state, the first value being lower than the second value.

* * * * *